United States Patent
Fountoukas

(10) Patent No.: US 9,361,477 B2
(45) Date of Patent: *Jun. 7, 2016

(54) ALTERNATELY PROCESSING MESSAGES

(71) Applicant: Accenture Global Services Limited, Dublin (IE)

(72) Inventor: Alexandros Fountoukas, Wiesbaden (DE)

(73) Assignee: Accenture Global Services Limited, Dublin (IE)

( * ) Notice: Subject to any disclaimer, the term of this patent is extended or adjusted under 35 U.S.C. 154(b) by 52 days.

This patent is subject to a terminal disclaimer.

(21) Appl. No.: 14/503,608

(22) Filed: Oct. 1, 2014

(65) Prior Publication Data

US 2015/0095375 A1  Apr. 2, 2015

Related U.S. Application Data

(63) Continuation of application No. 11/742,439, filed on Apr. 30, 2007, now Pat. No. 8,869,169.

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 21/62* | (2013.01) |
| *G06F 9/54* | (2006.01) |
| *G06F 17/30* | (2006.01) |
| *G06Q 10/08* | (2012.01) |

(52) U.S. Cl.
CPC ............ *G06F 21/6218* (2013.01); *G06F 9/466* (2013.01); *G06F 9/546* (2013.01); *G06F 17/30424* (2013.01); *G06Q 10/087* (2013.01)

(58) Field of Classification Search
None
See application file for complete search history.

(56) References Cited

U.S. PATENT DOCUMENTS

| | | |
|---|---|---|
| 5,428,761 A | 6/1995 | Herlihy |
| 6,519,568 B1 | 2/2003 | Harvey |

(Continued)

FOREIGN PATENT DOCUMENTS

WO   WO0133407 A3   12/2002

OTHER PUBLICATIONS

Tanenbaum, A.S., "Modern Operating Systems, Passage," Englewood Cliffs, Prentice Hills, U.S., 1992, pp. 33-61 (XP002391725).

(Continued)

*Primary Examiner* — H S Sough
*Assistant Examiner* — Kimberly Jordan
(74) *Attorney, Agent, or Firm* — Fish & Richardson P.C.

(57) ABSTRACT

Among other things, processing an incoming message stream includes storing context data of an application in a global database. Various messages from the incoming message stream are placed in an in-memory message queue. One of at least a first and a second phases at a first process is executed, and another of the at least first and second phases at a second process is also executed, so as to alternately execute a first phase and a second phase by a first process and a second process. The first phase includes processing at least one message from the various messages and storing at least one corresponding result in a local memory area. The first phase also includes storing at least one modification to the context data in the local memory area. The second phase includes performing a transaction of the at least one result and the at least one modification of the context data to the global database and committing the transaction.

20 Claims, 7 Drawing Sheets

(56) References Cited

U.S. PATENT DOCUMENTS

| | | | |
|---|---|---|---|
| 6,725,457 B1 | 4/2004 | Priem | |
| 6,970,945 B1 | 11/2005 | Berkman | |
| 2006/0015416 A1* | 1/2006 | Hoffman et al. | 705/28 |
| 2009/0077324 A1* | 3/2009 | Smith | G06F 9/544 711/147 |
| 2011/0206377 A1* | 8/2011 | Binkert | H04L 12/40163 398/83 |
| 2013/0290583 A1* | 10/2013 | Dice | G06F 9/526 710/200 |
| 2013/0290967 A1* | 10/2013 | Calciu | G06F 9/526 718/102 |

OTHER PUBLICATIONS

Little, M.C. et al, "Constructing Reliable Web Applications Using Atomic Actions," Computer Networks and ISDN Systems, North Holland Publishing, Amsterdam, NL, vol. 29, No. 8-13, Sep. 1997, pp. 1281-1290 (XP004095324). ISSN: 0169-7552.

Hilzer, Jr. R.C., "Synchronization of the Producer/Consumer Problem Using Semaphores, Monitors, and the ADA Rendezvous," Operating Systems Review, ACM, New York, NY, U.S., vol. 26, No. 3, Jul. 1, 1992, pp. 31-39 (XP000325045). ISSN: 0163-5980.

European Patent Office Extended European Search Report for International Application No. 07008796.0 dated Oct. 24, 2007, 9 pages.

U.S. Non-Final Office Action for U.S. Appl. No. 11/742,439 dated Oct. 8, 2010, 13 pages.

U.S. Final Office Action for U.S. Appl. No. 11/742,439 dated Mar. 25, 2011, 17 pages.

U.S. Non-Final Office Action for U.S. Appl. No. 11/742,439 dated Mar. 28, 2013, 20 pages.

Arthur J. Bernstein, David S. Gerstl and Philip M. Lewis; Concurrency control for step-decomposed transactions; Mar. 20, 2000; 26 pages.

U.S. Final Office Action for U.S. Appl. No. 11/742,439 dated Sep. 26, 2013, 23 pages.

U.S. Notice of Allowance for U.S. Appl. No. 11/742,439 dated Jul. 22, 2014, 20 pages.

* cited by examiner

| Processing Flow of an Application according to the traditional methods in use | | | |
|---|---|---|---|
| Action | | Cost (TU) | Total Cost (TU) |
| Start Transaction | | 1 | 3 |
| For 10 Messages | Get Message | 10x1 | 10 |
| | Save Message in DB | 10x2 | 20 |
| | Process Message | 10x1 | 10 |
| | Save Results in DB | 10x2 | 20 |
| | Update Context | 10x1 | 10 |
| Save Context | | 2 | 2 |
| Commit Transaction | | 5 | 5 |
| Total | | | 78 |

Figure 4

Processing Flow of an Application according to the Alternating Processing Method

| Phase | Action | | | Cost (TU) | Total Cost (TU) |
|---|---|---|---|---|---|
| Memory | | | | | |
| | For 10 Messages | | | | |
| | | | Get Message | 10x1 | 10 |
| | | | Log Message in MEM | 10x1 | 10 |
| | | | Process Message | 10x1 | 10 |
| | | | Log Results in MEM | 10x1 | 10 |
| | | | Update Context | 1 | 1 |
| | Log Context in MEM | | | | |
| Total Memory Phase | | | | | 51 |
| Disk | | | | | |
| | Start Transaction | | | 1 | 1 |
| | Save Results in DB | | | 10x2x2 | 40 |
| | Save Context in DB | | | 2 | 2 |
| | Commit Transaction | | | 5 | 5 |
| Total Disk Phase | | | | | 48 |
| Grand Total | | | | | 99 |

Figure 5

ALTERNATELY PROCESSING MESSAGES

CROSS-REFERENCE TO RELATED APPLICATION

This application is a continuation (and claims the benefit of priority under 35 USC 120) of U.S. application Ser. No. 11/742,439, filed Apr. 30, 2007, now allowed, which is incorporated by reference in its entirety.

TECHNICAL FIELD

The description is directed generally to message processing applications and/or services, in particular to algorithms for time critical and secure transactions, and more particularly, to a computer-implemented method, computer program product, and system for processing an incoming message stream.

BACKGROUND

Message processing applications and/or services such as database-driven trading engines (e.g. to match incoming orders against those being in an order book) or web-based booking applications (e.g. for online seat booking of a large airline) may in general refer to applications and/or services having a high volume throughput of messages, i.e. a high number of incoming messages has to be (automatically) processed. Additionally, an underlying storage system such as a database (e.g. storing an order book or a seat availability situation of a plurality of flights performed by an airline) has to be adjusted to modifications and/or changes (e.g. the order book according to received orders or the booking application according to the current seat availability situation) in view of the processed incoming messages and/or requests.

In particular, computer-implemented message processing applications and/or services have a high number of incoming messages and/or requests that need to be (automatically) processed, i.e. the applications and/or services have a high (messages) throughput. According to such applications, processing results of the incoming messages have impact on how subsequent messages will be processed. Furthermore, the way a (incoming) message has been processed and the impact that the processed message has on the context data of an application and/or a service (e.g. the current state of an order book, wherein the context data of the order book may be changed according to incoming orders) need to be retrieved and/or analyzed at some later state. Additionally, the context data of an application and/or service need to be persistent, i.e. in case of a failure, the application and/or service should be able to reconstruct its context data to the state after the last successfully processed message.

Unfortunately, there might be a bottleneck between an optimized high throughput (of processed messages per time unit) and persistence of a message processing application and/or service. On the one hand, high throughput may be best achieved with pure memory operations. On the other hand, persistence requires rather expensive database transactions in order to ensure data integrity.

SUMMARY

Techniques for processing incoming messages are disclosed.

In one aspect, an incoming message stream is processed by storing context data (and/or an application context) of an application in a global database (on a server). In addition, various messages from the incoming message stream are placed in an in-memory message queue (located on the server) (wherein the messages are received from one or more clients). One of at least a first and a second phases at a first process is executed, and (particularly substantially at the same time) another of the at least first and second phases at a second process is also executed, so that at least the first phase and the second phase by the first process and the second process are alternately executed. The first phase includes processing at least one message form the plurality of messages and storing at least one corresponding result in a local memory area. The first phase also includes storing at least one modification to the context data in the local memory area. The second phase includes performing a transaction of the at least one result and the at least one modification of the context data to the global database committing the transaction.

Implementations can optionally include one or more of the following features. Alternately executing a first phase and a second phase can include coordinating and synchronizing the first and second phases using a first semaphore and a second semaphore. Alternatively, alternately executing a first phase and a second phase can include receiving a first semaphore at the first process; releasing the first semaphore after having received a second semaphore at the first process; and releasing the second semaphore at the first process after having completed the second phase. Alternately executing a first phase and a second phase can further include executing the first phase at the first process having the first semaphore while executing the second phase at the second process having the second semaphore. Alternately executing a first phase and a second phase can further include executing the second phase at the first process having the second semaphore while executing the first phase at the second process having the first semaphore. In addition, placing incoming data from the incoming message stream in an in-memory message queue can be performed by a routing server or by a dispatching server. Also, the context data can include audit and application context data. Further, the in-memory message queue can be stored in a global memory area. The global memory area and the global database can be shared by the first and second processes.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

BRIEF DESCRIPTION OF THE DRAWINGS

FIG. 4 shows an exemplary table of a message processing flow using a traditional method for processing an incoming message stream.

FIG. 5 shows an exemplary table of a message processing flow using an alternating processing method.

Like reference symbols and designations in the various drawings indicate like elements.

DETAILED DESCRIPTION

In the following, a detailed description of examples are given with reference to the drawings. It should be understood that various modifications to the examples may be made. In particular, elements of one example may be combined and used in other examples to form new examples.

Figure 1:
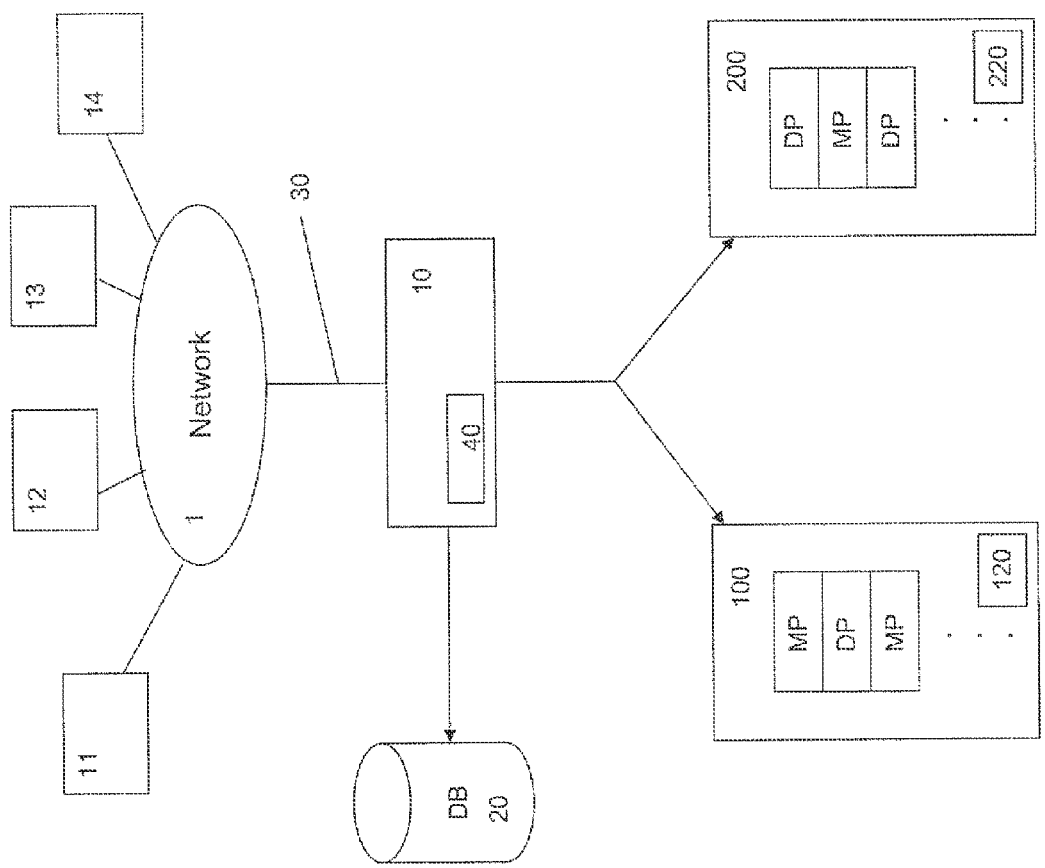
FIG. 1 shows a block diagram of an exemplary message processing system.

With respect to FIG. 1 an exemplary message processing system is shown. An application 10 receives various messages from an incoming message stream 30 through a network 1 such as the Internet. The various messages received are sent from one or more clients 11, 12, 13, 14 to the application 10. The incoming messages from the incoming message stream 30 are stored in an in-memory message queue 40, which may be sharable by at least a first process 100 and a second process 200 processing messages from the incoming message stream 30. Context data of the application 10 is stored in a global database 20. The global database 20 may be accessed by the first and second processes 100 and 200. The first and second processes process the incoming messages in at least two phases, a first phase MP and a second phase DP, as follows: (1) while one 100 of the two processes 100 and 200 is executing the first phase MP, the other 200 of the two processes is executing the second phase DP and vice versa. In other words, the first and second processes 100 and 200 alternately execute the first and second phases MP and DP. In some implementations, the first and second phases MP and DP may not be executed by one of the two processes 100 and 200 (substantially) concurrently. Furthermore, each of the two processes 100 and 200 has a local memory 120 and 220, which may be used to store processing data resulting from executing the first phase MP and which is persistently stored in the global database 20 during the (subsequent) second phase DP.

Figure 2:
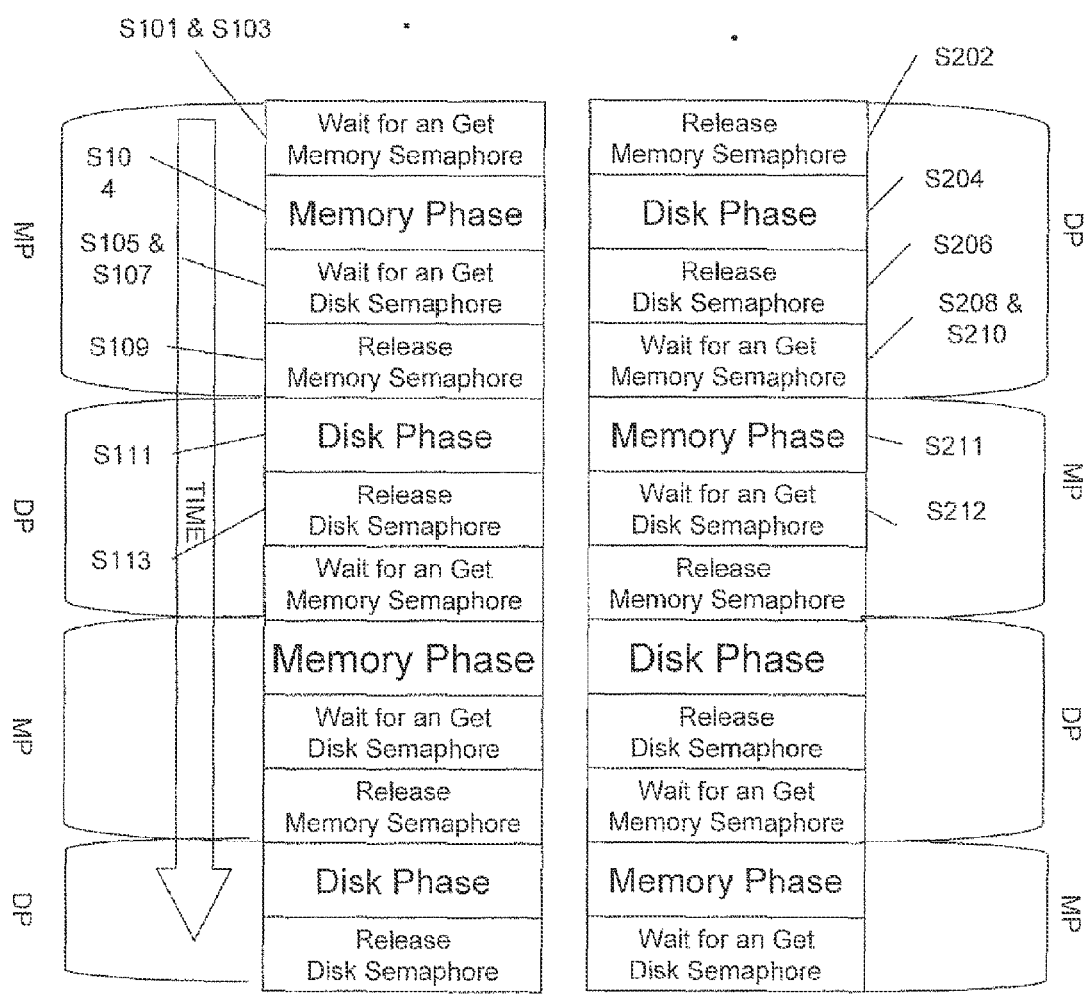
FIG. 2 shows a block diagram of an exemplary sequence of getting and releasing a first semaphore and a second semaphore together with a first phase and a second phase of an algorithm for processing an incoming message stream by first and second processes.

FIG. 2 shows an exemplary sequence of getting and releasing a first semaphore and a second semaphore by a first process 100 and a second process 200 of an exemplary (automated) alternating message processing method. The first and second processes 100 and 200 are two instances of an application 10 or service for processing an incoming message stream 30 by alternately taking responsibility for automatically processing the incoming message stream 30 of the application 10. The first and second processes 100 and 200 perform (substantially) in parallel two independent phases MP and DP of the message processing method (i.e. the first and second processes 100 and 200 alternately execute a first phase MP and a second phase DP.) In other words, one 100 of the first and second processes 100 and 200 exclusively executes the first phase MP while the other 200 of the two processes exclusively executes the second phase DP and vice versa. Therefore, processing of the first and second phases MP and DP performed by the first and second processes 100 and 200 are not overlapping.

For example, applications 10 that process a (possibly) high number of incoming messages (requests and/or data) include applications that manage incoming orders and a corresponding order book in a database management system or web-based managing of (e.g., online) seat booking of a large airline for multiple flights. In an exemplary aspect, such applications 10 have context data (i.e. an application context) that include, for example, a state of the order book or a state of the number of seats booked on various flights at a given time point. Whenever an incoming message is processed (e.g. to make an order or to book a seat on flight XYZ), the result has an impact on the context data of the application 10 (on the application context itself), i.e. the order book has been changed according to the order made or the number of available seats on flight XYZ has been reduced by one according to the requested reservation. Furthermore, the incoming messages are processed subsequently according to their incoming time stamps and/or sequential order, because the processing result of one message may have (direct) impact on how subsequent messages will be processed. For example, after having booked a seat for flight XYZ a subsequent request for booking a seat on said flight might fail due to now booked-out flight XYZ.

In some implementations, incoming messages of an application 10 are (automatically) placed in an in-message queue 40 in a global memory area by an assisting application 10, such as a routing server or a dispatching server.

In general, a routing server directs forwarding to pass logically addressed (data) packets, e.g. messages and/or (data) requests, towards their destination (which is, in one exemplary aspect the in-message queue 40 of the application 10). The (data) packets may be routed through one or more intermediate nodes (access points). Routing may be performed from one application program in a computer to memory space of another application program in the computer. Alternatively, routing may be performed from a client computer to a specified memory space on a server computer hosting the automated message processing application 10. The client may be, for example, a computer associated with a user having access to the server hosting the application 10 via the World Wide Web using an Internet protocol such as HTTP/IP. Dynamic routing is widely used throughout the World Wide Web. Similarly, a dispatching server is in principle responsible for receiving and transmitting messages (e.g. from a client computer where a user is making a request for a flight his/her via email program to an in-message queue 40 of a web-based seat booking application 10 hosted on a server computer) and possibly recording additional (important) information in accordance with the messages in a reserved memory area of the server.

For example, the in-message queue 40 is a data structure having a first-in-first-out memory structure. Furthermore, the overall application context is maintained in a global memory segment and a global database 20 stores audit and application context data in accordance with the application context, which may be used to check integrity and persistence of the application context. Additionally, the application 10 may have an application logic, which defines a way of processing the incoming messages including message validation and changes on the context data of the application context according to predefined processing rules (which may be stored in and retrieved from a repository).

In one exemplary aspect, the application logic may describe functional algorithms, which handle information and/or data exchange in an information management system between a client and a server. The application logic may include various processing rules, which may express a policy to be considered when automatically processing incoming messages, data and/or requests, and one or more workflows, which may organize and/or order tasks within the application 10 to pass data, messages, requests, and/or information from one system component of the application 10 to another. The processing rules may specify operations, definitions, and constraints, which should be considered when processing an incoming message and/or request. For example, when processing an online request on a seat booking application 10 that includes a request to a first-class upgrade on a given flight, the processing rule that states passengers may upgrade to first class tickets if seats are available and they pay the fare increase should be applied by the message processing application 10. The application logic and the included processing rules may be implemented in a service oriented architecture (SOA) using web-based languages such as XACML and corresponding message protocols such as SAML and/or programming languages such as JAVA and a Java-based architecture designed to implement server-oriented computing applications such as J2EE.

In some implementations, the resources, such as the in-memory message queue 40 and the application context that includes audit and context data, are stored in at least one global memory segment and/or in a (global) database 20 shared by the first and second processes 100 and 200.

In other words, the context of the application, i.e. the application context, resides in a global memory area as well as the in-message queue. Hence, the context data may be accessed and/or modified by the first and second processes during their first phase. Modifications done to the context data of the application are saved during the first phase into a local memory area of the first and second processes, respectively and are then saved in the global database during the second phase. During application startup and initialization, the data stored in the global database is used to setup the global memory area of the context of the application. Therefore, during the first phase, the process performing the first phase may access all required data and information from the memory area and does not need to do any disk I/O.

Besides the commonly shared resources, the first and second processes 100 and 200 are designed and implemented such that (automated or semi-automated) message processing can be divided into at least two independent phases MP and DP. A first phase MP is referred to as memory phase, and a second phase DP is referred to as disk phase. The first and second processes 100 and 200 alternately execute the memory and disk phases MP and DP, i.e. while the first process is executing the first phase MP of the message processing method, the second process is (at the substantially same time) executing the second phase DP of the message processing method and vice versa. That means, if the first process executes its memory phase MP, the second process executes its disk phase DP and vice versa. In other words, the two processes 100 and 200 execute their first and second phases MP and DP substantially in parallel with one of the two processes 100, 200 executing its first phase MP (respectively, its second phase) while (at the same time) the other of the two processes executes its second phase DP (respectively, its first phase). The two phases MP and DP, memory phase MP and disk phase DP are introduced in greater detail below.

FIG. 2 shows by example how the first and second processes 100 and 200 may be coordinated and synchronized such that none of the first and second processes 100 and 200 executes the same (memory or disk) phase MP, DP at the same time, and newer audit and context data of the application 10 is written in the global database 20 only after older audit and context data is committed. Because of processing time variations of the first and second phases MP and DP (i.e. it may take more time to execute the first phase MP or the second phase DP, respectively then its counterpart), it may happen that a first process 100 has executed its memory phase MP and is ready to commit its processed data (i.e. one or more results of the processed messages and at least one modification and/or chance to the context data of the application 10 according to the processed messages) before the a second process 200 has committed (one or more database transactions). In some implementations, such a situation is avoided.

As shown with reference to FIG. 2, coordination and synchronization of the first process 100 and the second process 200 may be achieved by using at least two semaphores, a first semaphore and a second semaphore. The first semaphore may be referred to as a memory semaphore and the second semaphore may be referred to as a disk semaphore. In some implementations, the memory semaphore is owned by a process 100, 200 before being allowed to enter the memory phase MP, and the disk semaphore is owned by a process 100, 200 before being allowed to enter the disk phase DP, respectively.

At S101, the first process 100 waits for the memory semaphore. After the second process 200 has released the memory semaphore (S202), the first process gets or allocates the memory semaphore S103 and can start executing its memory phase MP (S104) while at the substantially same time the second process 200 is executing its disk phase DP (S204). At the end of the memory phase MP of the first process 100, the first process 100 waits for the disk semaphore (S105). After the second process 200 has released the disk semaphore (S206), the first process 100 also gets or allocates the disk semaphore (S107). Since the first process 100 also waits for the disk semaphore before releasing the memory semaphore, it is ensured that the second process 200 has committed its disk phase DP before starting its subsequent memory phase MP. Subsequently, the first process 100, which now owns both semaphores, releases the memory semaphore (S109) for which the second process 200 is waiting (S208). Subsequently, the second process 200 receives the memory semaphore from the first process 100 (S210). The first process 100 may now execute its disk phase DP (S111). Substantially in parallel, the second process 200 executes its memory phase MP (S211). On completion of its disk phase DP, the first process 100 releases the disk semaphore (S113) for which the second process 200 is waiting (S212) after having finished its memory phase MP. At this point in time, the first process 100 waits for the memory semaphore to enter its next processing cycle, i.e. its next sequence of subsequently processing its memory and disk phases MP and DP. Accordingly, the second process 200 waits substantially at the same point in time for the disk semaphore to enter its next processing cycle, i.e. its next sequence of subsequently processing its disk and memory phases DP and MP.

The process of coordinating and synchronizing the first and second processes 100 and 200 by using a memory and a disk semaphore for alternately processing the memory and disk phases MP and DP by a first and a second process 100 and 200 as shown in FIG. 2 avoids deadlocks and ensures data (update) consistency of context data of an underlying application 10 having a high throughput of incoming messages.

In principle, a deadlock may refer to a specific condition when two or more processes are each waiting for another to release access to a resource such as a shared memory segment or a shared database to transmit message processing results and corresponding modifications on context data of an application 10. For example, if a first process of two processes takes a first resource and a second of the two processes takes a second resource, a deadlock occurs when the first process having access to the first resource needs additionally the second resource to continue processing while the second process additionally needs the first resource before the second process can release the second resource. Thus, both requests can not be satisfied, such that a deadlock occurs.

In principle, data consistency may summarize the validity, accuracy, usability, and integrity of related data and/or information across applications and/or services. In other words, data consistency may substantially ensure that, for example, each request to a seat booking application managing various flights of a large airline from a client observes a consistent view on the context data (i.e. the current seat availability situation) on a server including visible changes made by previous seat reservation requests and transactions of said changes to a database 20 storing the context data of the booking application. Hence, transactions of processed messages to the global database 20 of the application need to be consistent, such that the database 20 is consistent within the confines of many different transaction streams according to a processed incoming message stream 30.

Figure 3:
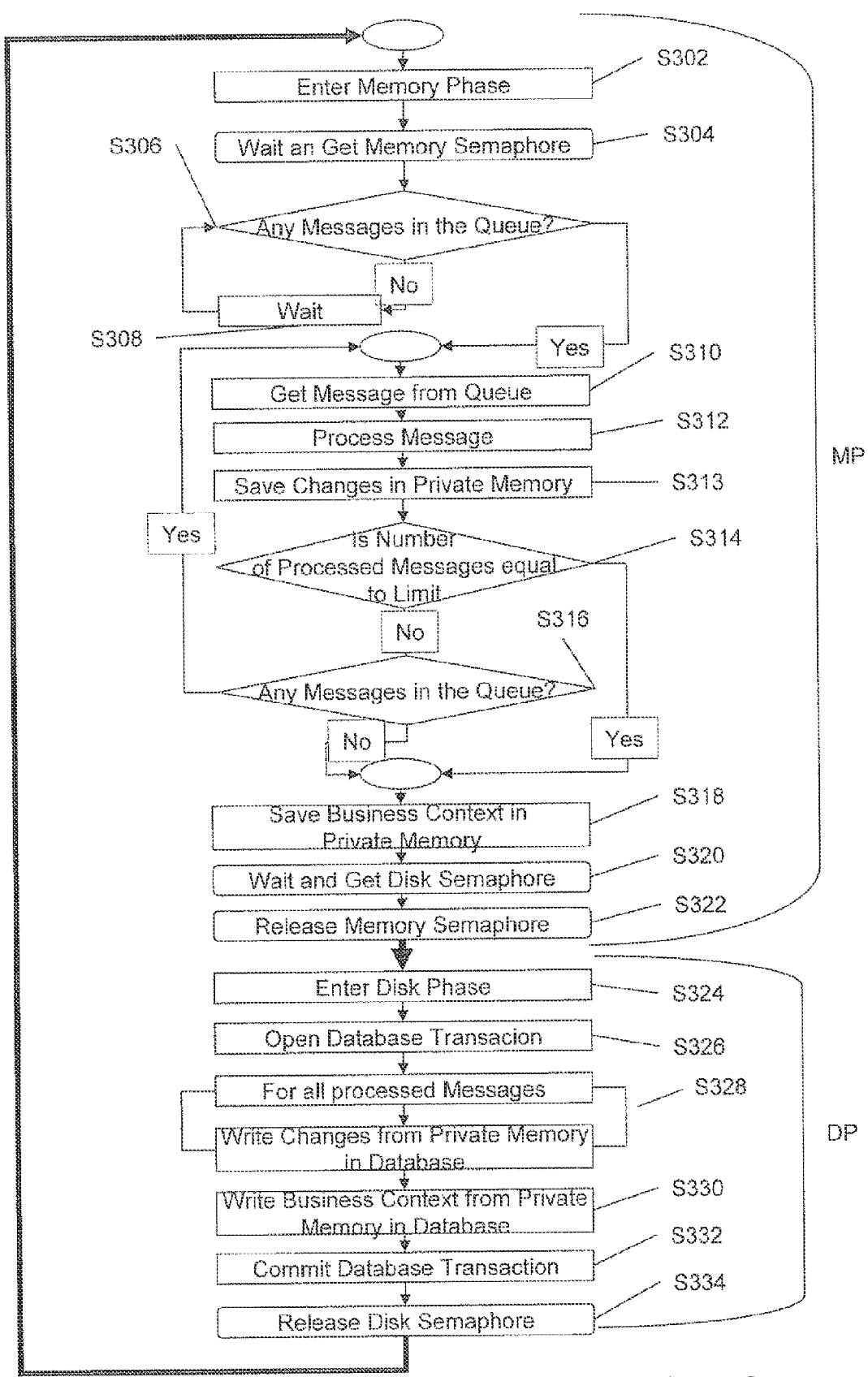
FIG. 3 shows a flow diagram of an exemplary alternating message processing method.

With reference to FIG. 3, an exemplary processing flow of one of the two processes 300 to alternately processing an incoming message stream 30 in the two phases MP and DP, memory phase MP and disk phase DP, is shown. At S302, the process 300 enters the memory phase MP and waits to receive or to get the memory semaphore (S304) from a second process 100, 200. After having received the memory semaphore, the process 300, which has unrestricted (i.e. full) access to a global memory area that includes an in-memory message queue 40 of incoming messages of an application 10, checks whether there are any messages in the in-memory message queue 40 waiting to be processed (S306). In case there are no messages in the in-memory message queue 40, the process waits for a (possibly predefined) period of time and rechecks the message queue 40 again (S308). In case there are one or more messages in the message queue 40, the first of the waiting messages is picked up by the process 300 (S310) and substantially immediately processed by the process 300 (S312). During processing of at least one message within the memory phase MP, the process 300 applies (or follows) the processing logic defined for the application 10. After having processed the message, the result of the processed message is stored in the local memory area of the process 300 (S313). After having processed a message and after having stored corresponding results in the local memory area, the process 300 checks, if a possibly predefined number of processed messages in the memory phase MP is achieved (S314). If said number has not been reached yet, the process 300 checks if there are still any messages left in the in-memory message queue 40 (S316). Depending on the tests and corresponding decisions, the process 300 either picks and processes the subsequent message from the message queue 40 by returning to S310 or terminates its memory phase MP processing (S318). The process 300 then saves and/or stores changes and/or modifications to the context data of the application 10 in accordance with the results of the processed messages in its local memory area (S318). In other words, the process 300 saves the modified application context in its local (i.e. private) memory area. In preparation for the following disk phase DP, the process 300 waits until it gets (or receives) the disk semaphore from its complementary process 200 (S320).

The complementary process 200 has processed its disk phase DP while at the substantially same time the process 300 has processed its memory phase MP. Having received the disk phase DP, the process 300, now owning both semaphores (i.e. the memory semaphore and the disk semaphore), releases the memory semaphore (S322) (corresponding to steps S109 and S209 in FIG. 2) and enters its disk phase DP (S324). At S326, the process 300 opens a database transaction to the global database 20 of the application 10 storing the audit and application context data of the application 10. Subsequently, the results form each of the messages processed within the previous memory phase MP are written or transmitted from the local memory area of the process 300 into the global database 20 of the application 10 one-by-one (S328). Additionally, the modified (or changed) context data of the application 10 according to the processed messages is also written (or transmitted) into the global database 20 (S330). Finally, the process 300 commits the database transaction (S332). After commitment, the process 300 releases the disk semaphore (S334) and is ready to start with its next memory phase MP.

In other words, while one 100 of the first and second processes 100 and 200 processes S302 to S322 of the message processing method 300 shown in FIG. 3, the other process 200 of the first and second processes 100 and 200 processes S324 to S334 of the message processing method 300. Processing of the first and second processes 100 and 200 is coordinated using first and second semaphores. The memory phase MP S302 to S322 and the disk phase DP S324 to S334 are iterated by the first and second processes 100 and 200 as shown in FIG. 2.

In an exemplary application 10, managing online seat booking of a large airline may use an alternating processing method for automatically processing incoming messages according to FIGS. 2 and 3. The online booking application 10 may be hosted on a server and messages and/or requests to the application 10 may be received from one or more clients 11, 12, 13, 14 over a network 1 such as the internet. The online booking application 10 may comprise two processes 100 and 200 for processing incoming messages, data, and/or requests by alternately processing a memory phase MP and a disk phase DP. Furthermore, the online booking application 10 may comprise an in-memory messages queue 40 stored in a global memory area at the server or accessible from the server and a global database 20 at the server or accessible from the server. Additionally, the context of the online booking application is stored in the global memory area. A global database 20 stores audit and application context data of the online booking application 10.

During its memory phase MP, a responsible process 300 processes incoming requests (i.e. messages) from one of the one or more clients 11, 12, 13, 14 based on the seat booking's application 10 underlying processing logic that includes a current state of the seat availability situation. The processing logic of the online seat booking application 10 may be stored at the server or may be globally accessible from the server. The processing logic may include rules which specify, for example, how to serve a request for booking at least one seat on a certain flight. After having processed a message, the result (e.g. a possibly booked seat on a particular flight) is stored in a local memory area of the process 300. Furthermore, after processing of one or more messages during its memory phase MP, the corresponding changes and/or modifications of the application context (i.e. the context data of the seat booking application 10) according to a possibly changed seat availability situation is stored in the local memory area of the process 300. If the process 300 has terminated its memory phase MP, which depends on whether a possibly predefined number of processed messages has been reached and/or whether no further messages are in the in-memory message queue 40, the process 300 waits for the disk semaphore to proceed with its disk phase DP. After having received the disk semaphore and subsequently having released the memory semaphore, the process 300 opens a transaction to the global database 20 of the seat booking application 10 and transmits one-by-one the results of the processed requests on seat booking for different flights. Furthermore, the process 300 transmits the modified context data of the application 10, i.e. a changed seat availability situation for one or more flights of the airline according to the processed messages into the global database 20 of the seat booking application 10. In other words, the updated application context (in accordance with the processed messages) is saved (or stored) in the global database 20. After the process 300 has transmitted the processed message results and the updated context data, the process commits the database transaction. Of course, whenever the process 300 is processing its memory phase MP (respectively, disk phase DP) its counterpart process 100, 200 is substantially in parallel processing its disk phase DP (respectively, memory phase MP).

In another exemplary aspect, the alternating processing method for processing large amounts of incoming messages as introduced with reference to FIGS. 2 and 3 may be applied to a high volume trading engine realized in an information and/or database management system. An incoming message stream 30 from one or more clients 11, 12, 13, 14 may include, for example, an order to add instructions for some database driven tradable financial instrument served by a server that includes at least one database. The trading engine matches the incoming orders against those orders being stored in an order book following a processing logic that includes rules such as that orders have to be processed depending on a best price and/or a time constraint. Orders not matching the processing logic are stored in the order book. Therefore, any action to an order (i.e. a result of an order being processed as well as changes and/or modifications to the order book due to stored orders not matching the processing logic) are audited. Furthermore, it is desirable to have the resulting trades secure for settlement purposes and the order book secure as well. Accordingly, those conditions of the trading engine might be fulfilled when processing the incoming orders using two message processing processes 100 and 200 having two phases MP and DP, a memory phase MP and a disk phase DP. The two phases MP and DP are performed alternately by the two processes 100 and 200. In particular, the incoming order stream may be continuously processed by any one process of the two processes 100 and 200 currently performing its memory phase MP. In this case, one of the processes 100, 200 currently possessing the memory semaphore and thus processes the memory phase MP has exclusive access to the order book stored in a database. Audit data, trades done and a changed and/or modified situation of the order book is transmitted and stored in the global database 20 of the trading engine by one process of the two processes 100 and 200 currently possessing the disk semaphore and therefore processing the disk phase DP.

A method as previously described with reference to FIGS. 2 and 3 includes two phases MP and DP, a memory phase MP and a disk phase DP, which may be alternately executed by two processes 100 and 200. One process 100 of the two processes 100 and 200 may execute its memory phase MP while (at the substantially same time) the other process 200 of the two processes 100 and 200 executes its disk phase DP and vice versa. Such processing method may be referred to as an optimistic algorithm for the following reasons: As shown in FIG. 2, one process 100 of the two processes 100 and 200 may enter and execute its memory phase MP (i.e. processes incoming messages and changes and/or modifies the corresponding context data of the application 10) before the other process 200 of the two processes 100 and 200 commits its database transaction to the global database 20 of the application 10. Therefore, if the process 200, which is executing its disk phase DP, fails to successfully execute its disk phase DP, both its own actions (i.e. the results and context data modifications processed during its previous memory phase MP) and the actions (i.e. processed incoming messages and changes to the context data of the application 10) performed by the other process 100 during the memory phase MP executed substantially in parallel are rolled back. In principle, a rollback may include the undoing of partly complete database changes, when a database transaction is determined to have failed.

Depending on availability requirements of an application 10 having a high message throughput and thus requiring message processing, one or more strategies may be used in failure cases when an alternative processing method according to FIGS. 2 and 3 is used for the application 10. The one or more error processing strategies may include a mutual interlocking mechanism between a first and a second process alternately executing a first and a second phase MP and DP. Such mechanisms are described in greater detail below.

Availability may refer to a level of service provided by an application and/or system. A highly available system may have a minimal downtime (whether planned or unplanned). Availability of a system, an application, a database, and/or a server may be expressed in terms of the percentage of time that a system, and/or an application is available. Availability requirements may be achieved in a system and/or application by implementing fault tolerance mechanisms to mask or minimize the impact of failures of the components and dependencies of the system and/or application. Fault tolerance may be achieved by implementing redundancy to single points of failure components.

In some implementations, an application 10 has very low availability requirements (e.g. less than 70% of time that the application 10 needs to be available). In this case, if a first process 100 processing a memory phase MP or a disk phase DP detects that a second process 200 alternately processing a disk phase DP or a memory phase MP, respectively alternatively executes an alternative message processing method as shown in FIGS. 2 and 3, the first process 100 substantially immediately stops processing of the still running phase. Accordingly, a signal received at the first process 100 from the second process 200, which indicates that the second process has failed, interrupts the processing of a phase by the still running first process 100, which exits substantially immediately.

In some implementations, an application 10 has low availability requirements (e.g. less than 80% of time that the application 10 needs to be available). In this case, if a first process 100, which is executing the disk phase DP, detects that a second process 200 (which is executing the memory phase MP) failed, the first process 100 stops processing after having committed data in process (e.g. after having committed message results and context data of the application 10 transmitted to a global database 20 of the application 10). Accordingly, a signal received at the first process 100 from the second process 200, which indicates that the second process has failed and/or died, is queued by the first process 100. The signal is checked at the time the first process 100 enters a new phase. In other words, if the second process 200, which is currently processing the memory phase MP, fails, the first process 100 completes the disk phase DP, and detects the failure of the second process 200 when entering the memory phase MP due to the signal checked after having completed the disk phase DP. In this case, the first process 100 is forced to exit the memory phase MP.

In some implementations, an application 10 has high availability requirements (e.g. more than 90% of time that the application 10 needs to be available). In this case, if a first process 100 (which is executing the memory phase MP or the disk phase DP) detects that a second process 200 (which is executing the disk phase DP or the memory phase MP, respectively) failed or died, the first process 100 substantially immediately stops processing and rolls back all processed but not jet committed data (such as results from processed messages and corresponding modifications and/or changes to context data of the application 10). For this purpose, additional logging data are written into a local memory of the first and second processes 100 and 200 when executing the memory phase MP, such that results from processed messages and/or modifications to context data of the application 10 stored in the local memory of the corresponding process 100, 200 may be undone. A signal, which indicates one process 100, 200 that the corresponding process 100, 200 has died or failed is queued by the process and is checked after the process 100, 200 enters a new phase. In other words, each of the two processes 100 and 200 still has its own private memory area to store modifications of context data of the application 10, which is in the case of high availability requirements global and thus accessible from both processes 100 and 200 in order to allow roll back actions performed by the corresponding died partner process. Depending on whether a process 100, 200 failed or died during the memory phase MP or the disk phase DP, the following actions or operations are performed: A process 100 detects, when entering the memory phase MP, that a corresponding process 200 has died or failed. Accordingly, the corresponding process 200 has been in the memory phase MP, when it failed. The process 100 therefore rolls back the actions (i.e. processing steps) done by the corresponding process 200 and continues with processing of unprocessed messages waiting in the in-memory message queue 40. Hence, the messages processed by the corresponding process 200, which has failed, are undone and, thus, again in the in-memory message queue 40 waiting to be processed.

A process 100 detects, when entering the disk phase DP, that a corresponding process 200 has died or failed. Accordingly, the corresponding process 200 has been in the disk phase DP, when it failed. Thus, the transactions started and/or finished by the corresponding process 200 from its local memory area to the global database 20 has not been committed. Therefore, the process 100 (which is still running), performs the following actions and/or operations:
(1) rollback its own actions (performed during its previous memory phase MP);
(2) rollback the actions performed by the corresponding process 200, which have been performed during the failed disk phase DP as well as the actions of the memory phase MP of the corresponding process 200 performed before;
(3) substantially immediately exit the disk phase DP (there being no data that may be committed); and/or
(4) enter a new memory phase MP to re-execute the unprocessed messages, which have been undone during the rollback, and continue.

Figure 6:
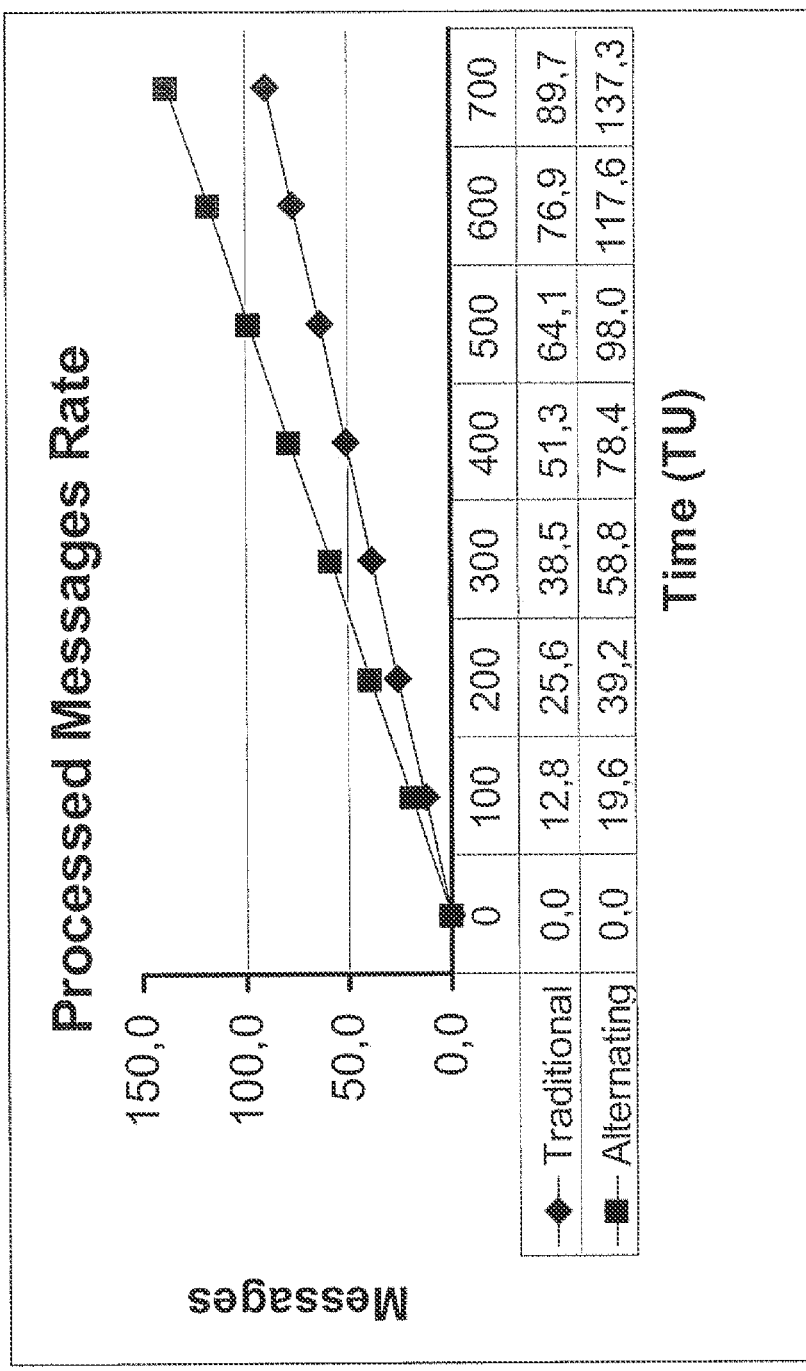
FIG. 6 shows an exemplary diagram comparing processed message rates of a traditional method and an alternating processing method.

With reference to FIGS. 4 to 6, benefits regarding efficiency of an automated alternating message processing method according to FIGS. 2 and 3 are compared to a traditional processing method, which may not execute two different phase alternately by two processes. In some implementations, one or more of the following assumptions may be made:
(1) An action performed in a memory has a cost of (i.e. requires) 1 time units.
(2) Writing data to a database 20 requires 2 time units.
(3) Opening a transaction to a database 20 requires 1 time unit.
(4) Committing the data written into the database 20 requires 5 time units.
(5) A process processes 10 messages inside a database 20 transaction.
(6) A time unit may refer to commonly used units such as millisecond, second, minute, etc.

As shown in FIG. 4, processing 10 messages by the traditional method requires 78 time units. With reference to FIG. 5, it is shown that in a simplified and not optimized implementation of the alternating processing method (as shown in FIGS. 2 and 3), that also the alternating processing method implies in total a longer processing time (99 time units), a first and a second process 100 and 200 can process 10 messages every 51 time units (i.e. the time, the longer of the two phases MP and DP requires to process 10 messages) compared with 78 time units of the traditional application 10 shown in FIG. 4.

FIG. 6 illustrates for the traditional method and for the alternating processing method their corresponding message processing rate as a function of time. For example, during 500 time units the alternating processing method may process 98 messages, but the traditional method may merely process 64.1 messages within the same amount of time. Accordingly, the alternating message processing method may offer an improved efficiency in processing messages from an incoming message stream 30 which have impact on context data of the underlying application 10. Furthermore, optimizations may reduce the processing time of the memory phase MP under that of the disk phase DP (i.e. 48 time units), which denotes a limiting factor for data processing throughput.

In case of writing data, which has been stored in a local memory of one of two processes 100 and 200 during execution of the memory phase MP, not one-by-one into a global database 20 during the disk phase DP but rather as a whole may additionally enhance the throughput of message processing. Thus, using an automated alternating processing method according to FIGS. 2 and 3 to process large incoming messages streams using two processes alternately executing a first phase MP and a second phase DP may achieve a message throughput near to the theoretical possible throughput. The theoretical throughput may be the maximum number of messages per time unit that may be processed by an application 10, if no input/output operations are performed.

Figure 7:
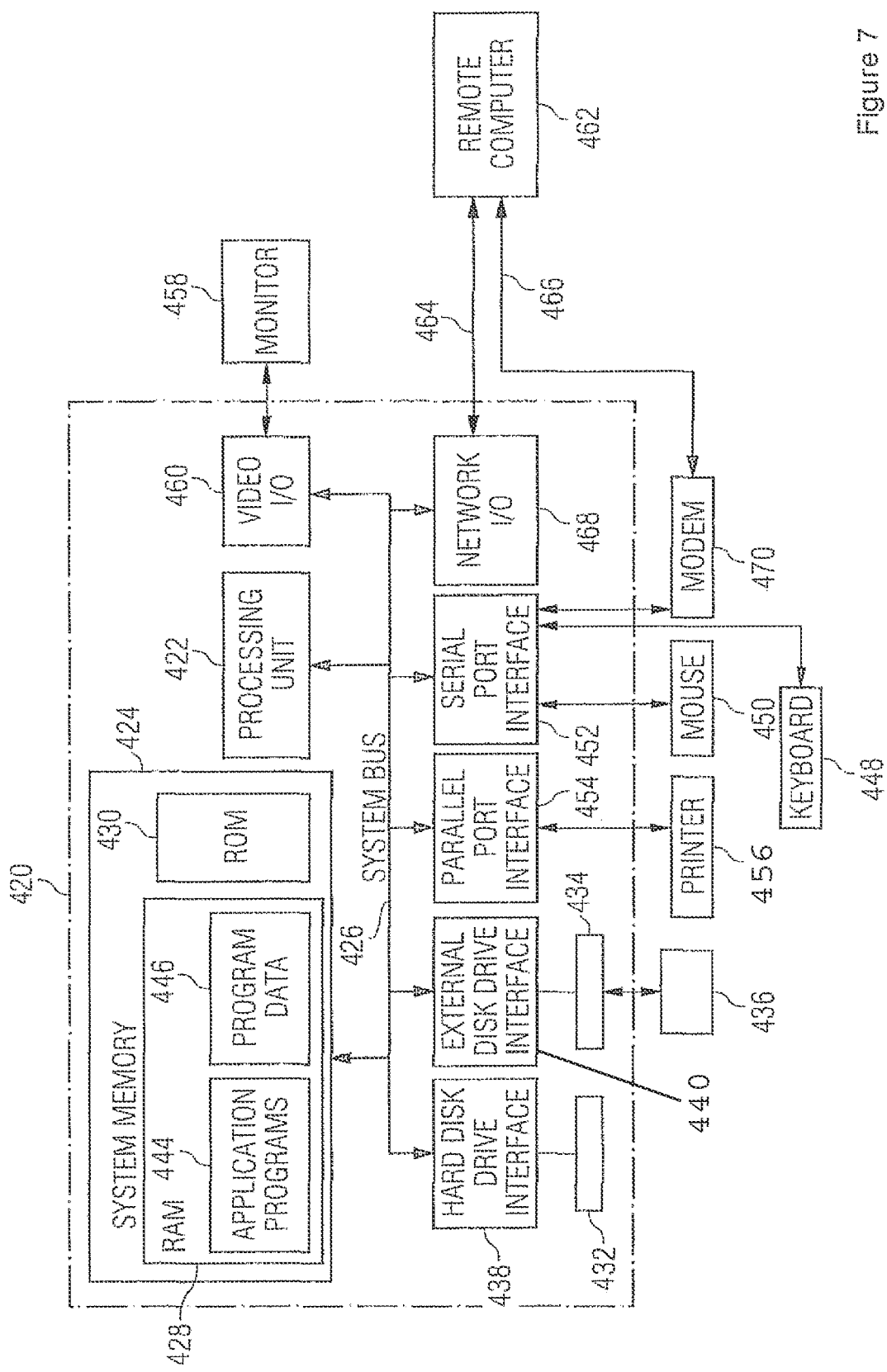
FIG. 7 shows an exemplary computer (network) system.

FIG. 7 shows a system that includes a general purpose computing device in the form of a conventional computing environment 420 (e.g. personal computer). The personal computer 420 includes either at least one processing unit 422 with at least dual core capabilities, so that at least two processes can run simultaneously or at least two processing units, which may, in turn, comprise dual core capabilities. The personal computer 420 also includes a system memory 424, and a system bus 426, that couples various system components including the system memory 424 to the processing unit 422. The processing unit 422 may perform arithmetic, logic and/or control operations by accessing system memory 424. The system memory 424 may store information and/or instructions for use in combination with processing unit 422. The system memory 424 may include volatile and non-volatile memory, such as random access memory (RAM) 428 and read only memory (ROM) 430. A basic input/output system (BIOS) containing the basic routines that helps to transfer information between elements within the personal computer 420, such as during start-up, may be stored in ROM 430. The system bus 426 may be any of several types of bus structures including a memory bus or memory controller, a peripheral bus, and a local bus using any of a variety of bus architectures.

The personal computer 420 may further include a hard disk drive 432 for reading from and writing to a hard disk (not shown), and an external disk drive 434 for reading from or writing to a removable disk 436. The removable disk may be a magnetic disk for a magnetic disk driver or an optical disk such as a CD ROM for an optical disk drive. The hard disk drive 434 and external disk drive 434 are connected to the system bus 426 by a hard disk drive interface 438 and an external disk drive interface 440, respectively. The drives and their associated computer-readable media provide nonvolatile storage of computer readable instructions, data structures, program modules and other data for the personal computer 420. The data structures may include relevant data of the implementation of the alternating processing method for processing an incoming message stream 30, as described in greater detail above. The relevant data may be organized in a database, for example a relational or object database.

Although the exemplary environment described herein employs a hard disk (not shown) and an external disk, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 430 or RAM 428, including an operating system (not shown), one or more application programs 444, other program modules (not shown), and program data 446. The application programs may include at least a part of the functionality as detailed in FIGS. 1 to 6.

A user may enter commands and information, as discussed below, into the personal computer 420 through input devices such as keyboard 448 and mouse 450. Other input devices (not shown) may include a microphone (or other sensors), joystick, game pad, scanner, or the like. These and other input devices may be connected to the processing unit 422 through a serial port interface 452 that is coupled to the system bus 426, or may be collected by other interfaces, such as a parallel port interface 454, game port or a universal serial bus (USB). Further, information may be printed using printer 456. The printer 456, and other parallel input/output devices may be connected to the processing unit 422 through parallel port interface 454. A monitor 458 or other type of display device is also connected to the system bus 426 via an interface, such as a video input/output 460. In addition to the monitor, computing environment 420 may include other peripheral output devices (not shown), such as speakers or other audible output.

The computing environment 420 may communicate with other electronic devices such as a computer, telephone (wired or wireless), personal digital assistant, television, or the like. To communicate, the computer environment 420 may operate in a networked environment using connections to one or more electronic devices. FIG. 7 depicts the computer environment networked with remote computer 462. The remote computer 462 may be another computing environment such as a server, a router, a network PC, a peer device or other common network node, and may include many or all of the elements described above relative to the computing environment 420. The logical connections depicted in FIG. 7 include a local area network (LAN) 464 and a wide area network (WAN) 466. Such networking environments are commonplace in offices, enterprise-wide computer networks, intranets and the Internet.

When used in a LAN networking environment, the computing environment 420 may be connected to the LAN 464 through a network I/O 468. When used in a WAN networking environment, the computing environment 420 may include a modem 470 or other means for establishing communications over the WAN 466. The modem 470, which may be internal or external to computing environment 240, is connected to the system bus 426 via the serial port interface 452. In a networked environment, program modules depicted relative to the computing environment 420, or portions thereof, may be stored in a remote memory storage device resident on or accessible to remote computer 462. Furthermore other data relevant to the application of the insurance claim management evaluation method may be resident on or accessible via the remote computer 462. The data may be stored for example in an object or a relation database. It will be appreciated that the network connections shown are exemplary and other means of establishing a communications link between the electronic devices may be used.

Following technical terms that are widely used in this specification may refer to but are not limited to the subsequently given explanations. For example, an application or application program as described in this specification may refer to, among other things, a class of computer software, which employs the capabilities of a computer and/or computer network (directly) to one or more tasks, a plurality of users wishes to perform. In this context the term application may refer to both the application software (i.e. one or more programs that benefits the user) and its implementation in a computer and/or a computer network.

A message as described in this specification may refer to, among other things, a set of data such as a request received at a server from a client (or transmitted to the server). Data may become a message when it is transmitted over a (computer) network. An example of a message may be an email received via the Internet, which contains text and possibly other file attachments. Another example of a message may be a voice mail received over a network using, e.g. voice over IP. A message stream may be a continuous flow of messages from one or more clients to a server transmitted over a network. Accordingly, a message stream implies sending data from one or more clients to a server. The server may be for example an IP-based network server. Processing a message stream may comprise manipulating messages from the message stream within a computer. Processing itself may imply performing or doing work by means of a computer or computer-based device.

A queue or data queue as described in this specification may refer to, among other things, a data structure to store data in a memory area of a computer. A queue may be based on a First In, First Out or first-come, first served behavior. In other words, data, which comes in first into the queue is first processed, what comes in next waits until the first is finished, etc. For example, an incoming message stream of an application may be stored in an in-memory message queue and may be served by one or more processed.

Throughput as described in this specification may refer to, among other things, the total amount of work or processing done by a computer or an application in a given period of time. For example, an application processing incoming messages from an incoming message stream may have a certain throughput of incoming messages that need to be processed per time unit (e.g. millisecond, second, minute, etc.). An application having a high message throughput may have an incoming message rate of 10 to 20 thousand messages per second. A theoretical throughput that a process may perform during a time unit may refer to the maximum number of messages that can be processed by an application if it does no I/O operations.

An application logic as described in this specification may describe, among other things, one or more functional algorithms, which handle information and/or data exchange in an information management system between a client and a server. The application logic may comprise a plurality of processing rules, which may express a policy to be considered when (automatically or semi-automatically) processing incoming messages and one or more workflows, which may organize and/or order tasks within the application to pass messages, requests, and/or information from one system component (of the application) to another. The processing rules may specify operations, definitions, and constraints, which should be considered when processing an incoming message and/or request, e.g. when processing an online request on a seat booking application comprising a request to a first-class upgrade on a given flight, the processing rule that states passengers may upgrade to first class tickets if seats are available and they pay the fare increase need to be applied by the message processing application.

Audit and context data of an application as described in this specification may comprise, among other things, data which would allow for an examination of processed messages and the underlying (overall) application context. Audit may refer to a process of generating, recording, and reviewing a chronological record of messages processing to ascertain their accuracy and maintain data integrity. The application context may describe a state of the application at a point in time, e.g. the current seat availability situation of an online flight booking application. Accordingly, the context data and the application context may be changed and/or modified when one or more messages have been processed, e.g. seats on a flight XYZ are no longer available due to a booked-out flight XYZ. Such context data need to be considered, when subsequent messages are (automatically) processed.

A (database) transaction as described in this specification may be, among other things, a unit of interaction of a program or process with a database management system or a similar system that is treated in a coherent and reliable way independent of other transactions that must be either entirely completed or aborted. A transaction might require several queries, each reading and/or writing data in the database. During such a transaction, it may be important to ensure that the database is not left with only some of the queries carried out. For example, when performing a money transfer, when the money was debited from one account, it is important that it is also credited to the depositing account. In order to make tentative database transactions permanent in the database, the transactions may be committed. A commitment makes changes performed on the database due to previous transactions visible to other processes and/or applications accessing the database.

A semaphore as described in this specification may be, among other things, a lock variable used to coordinate and synchronize processes. In an application and/or system having a plurality of processes requiring controlled access to shared resources (e.g. memory and/or processors) a mechanism is provided to decide which process gets the semaphore and to provide an operation that locks a semaphore. In a simple case, this may be an atomic swap operation setting the semaphore to either 1 (true) or 0 (false), i.e. setting a flag being true or false.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The above-described computing system is only one example of the type of computing system that may be used to implement the alternating processing method for processing an incoming message stream 30. Other implementations, enhancements and variations can be made based on what is described and illustrated in this application.

What is claimed is:

1. A computer-implemented method comprising:
    obtaining, by a first instance of an application, exclusive access to a global memory area after a second instance of the application has released the exclusive access to the global memory area;
    processing, by the first instance that has obtained the exclusive access to the global memory area, information that is stored in the global memory area;
    obtaining, by the first instance of the application, exclusive access to a global database after the second instance of the application has released the exclusive access to the global database; and
    after the first instance has obtained the exclusive access to the global database:
        releasing, by the first instance, the exclusive access to the global memory area;
        storing, in the global database, a result of processing the information that was stored in the global memory area when the first instance of the application had obtained the exclusive access to the global memory area; and
        releasing, by the first instance of the application, the exclusive access to the global database.

2. The method of claim 1, wherein obtaining, by the first instance of the application, the exclusive access to the global memory area after the second instance of the application has released the exclusive access to the global memory area comprises:
    receiving, by the first instance of the application, an indication that the first instance has exclusive access to the global memory area.

3. The method of claim 1, wherein obtaining, by the first instance of the application, exclusive access to the global database after the second instance of the application has released the exclusive access to the global database comprises:
    receiving, by the first instance of the application, an indication that the first instance has exclusive access to the global database.

4. The method of claim 1, wherein releasing, by the first instance of the application, the exclusive access to the global memory area is conditioned upon the first instance obtaining the exclusive access to the global database.

5. The method of claim 1, wherein releasing, by the first instance of the application, the exclusive access to the global database does not depend upon the first instance obtaining the exclusive access to the global memory area.

6. The method of claim 1, wherein processing, by the first instance that has obtained exclusive access to the global memory area, information that is stored in the global memory area comprises:
    storing, in a first local memory area that is associated with the first instance, the result of the first instance processing the information stored in the global memory area.

7. The method of claim 6, wherein storing, in the global database, the result of the first instance processing the information that was stored in the global memory area comprises:
    storing, in the global database and from the first local memory associated with the first instance, the result of the first instance processing the information stored in the global memory area.

8. The method of claim 1, wherein while the first instance has exclusive access to the global memory area it does not have access to the global database, and while the first instance has exclusive access to the global database it does not have access to the global memory area.

9. The method of claim 1, further comprising:
after releasing, by the first instance of the application, the exclusive access to the global database, waiting to receive, by the first instance of the application, an indication that the first instance has obtained the exclusive access to the global memory area.

10. The method of claim 1, further comprising:
obtaining, by the second instance of the application, the exclusive access to the global memory area after the first instance of the application has released the exclusive access to the global memory area;
processing, by the second instance that has obtained the exclusive access to the global memory area, information that is stored in the global memory area;
obtaining, by the second instance of the application, the exclusive access to the global database after the first instance of the application has released the exclusive access to the global database; and
after the second instance has obtained the exclusive access to the global database:
  releasing, by the second instance, the exclusive access to the global memory area;
  storing, in the global database, a result of processing the information that was stored in the global memory area when the second instance of the application had obtained the exclusive access to the global memory area, by the second instance of the application; and
  releasing, by the second instance of the application, the exclusive access to the global database.

11. The method of claim 10, wherein obtaining, by the second instance of the application, the exclusive access to the global memory area after the first instance of the application has released the exclusive access to the global memory area comprises (i) waiting to receive, by the second instance of the application, an indication that the second instance of the application has exclusive access to the global memory area, and (ii) as a result of the first instance of the application not having the exclusive access to the global memory area, receiving, by the second instance of the application, the indication that the second instance has exclusive access to the global memory area, and
wherein obtaining, by the first instance of the application, exclusive access to the global database after the second instance of the application has released the exclusive access to the global database comprises (iii) waiting to receive, by the first instance of the application, an indication that the first instance of the application has exclusive access to the global database, and (iv) as a result of the second instance of the application not having the exclusive access to the global database, receiving, by the first instance of the application, the indication that the first instance has exclusive access to the global database.

12. The method of claim 10, wherein releasing, by the second instance of the application, the exclusive access to the global memory area is conditioned upon the second instance having the exclusive access to the global database, and
wherein releasing, by the second instance of the application, the exclusive access to the global database does not depend upon the second instance having the exclusive access to the global memory area.

13. The method of claim 10, wherein processing, by the first instance having exclusive access to the global memory area, information that is stored in the global memory area comprises storing, in a first local memory area that is associated with the first instance, the result of the first instance processing the information stored in the global memory area, and
wherein storing, in the global database, the result of the first instance processing the information that was stored in the global memory area comprises storing, in the global database and from the first local memory associated with the first instance, the result of the first instance processing the information stored in the global memory area.

14. The method of claim 1, wherein processing information stored in the global memory area by the first instance comprises:
processing, by the first instance, one or more messages and context data that are associated with the application and that are stored in the global memory area.

15. The method of claim 14, wherein the one or more messages comprise one or more requests to access an inventory associated with a business, and the context data indicates a status of the inventory associated with the business.

16. The method of claim 15, wherein a result of the first instance processing the information that was stored in the global memory area comprises an updated inventory associated with the business as a result of satisfying the one or more requests to access the inventory, and
wherein storing, in the global database, a result of the first instance processing the information that was stored in the global memory area comprises storing the updated inventory associated with the business to the global database.

17. The method of claim 1, wherein the first instance of the application corresponds to a first customer of the business and the second instance of the application corresponds to a second customer of the business.

18. The method of claim 1, further comprising:
obtaining, by a third instance of the application, the exclusive access to the global memory area after either the first instance or the second instance of the application has released the exclusive access to the global memory area; and
processing, by the third instance of the application that has obtained the exclusive access to the global memory area, information that is stored in the global memory area.

19. A system comprising:
one or more computers comprising at least one processor; and
a computer-readable medium coupled to the one or more computers having instructions stored thereon which, when executed by the one or more computers, cause the one or more computers to perform operations comprising:
obtaining, by a first instance of an application, exclusive access to a global memory area after a second instance of the application has released the exclusive access to the global memory area;
processing, by the first instance that has obtained the exclusive access to the global memory area, information that is stored in the global memory area;
obtaining, by the first instance of the application, exclusive access to a global database after the second instance of the application has released the exclusive access to the global database; and
after the first instance has obtained the exclusive access to the global database:
  releasing, by the first instance, the exclusive access to the global memory area;
  storing, in the global database, a result of processing the information that was stored in the global memory area when the first instance of the application had obtained the exclusive access to the global memory area; and releasing, by the first instance of the application, the exclusive access to the global database.

20. A non-transitory computer storage medium encoded with a computer program, the program comprising instructions that when executed by one or more computers cause the one or more computers to perform operations comprising:

obtaining, by a first instance of an application, exclusive access to a global memory area after a second instance of the application has released the exclusive access to the global memory area;

processing, by the first instance that has obtained the exclusive access to the global memory area, information that is stored in the global memory area;

obtaining, by the first instance of the application, exclusive access to a global database after the second instance of the application has released the exclusive access to the global database; and after the first instance has obtained the exclusive access to the global database:

releasing, by the first instance, the exclusive access to the global memory area;

storing, in the global database, a result of processing the information that was stored in the global memory area when the first instance of the application had obtained the exclusive access to the global memory area; and releasing, by the first instance of the application, the exclusive access to the global database.

* * * * *